Feb. 18, 1936.  C. E. PETERSON  2,031,573
MACHINE FOR USE IN THE MANUFACTURE OF CHEWING GUM
Filed Oct. 3, 1933  2 Sheets-Sheet 1
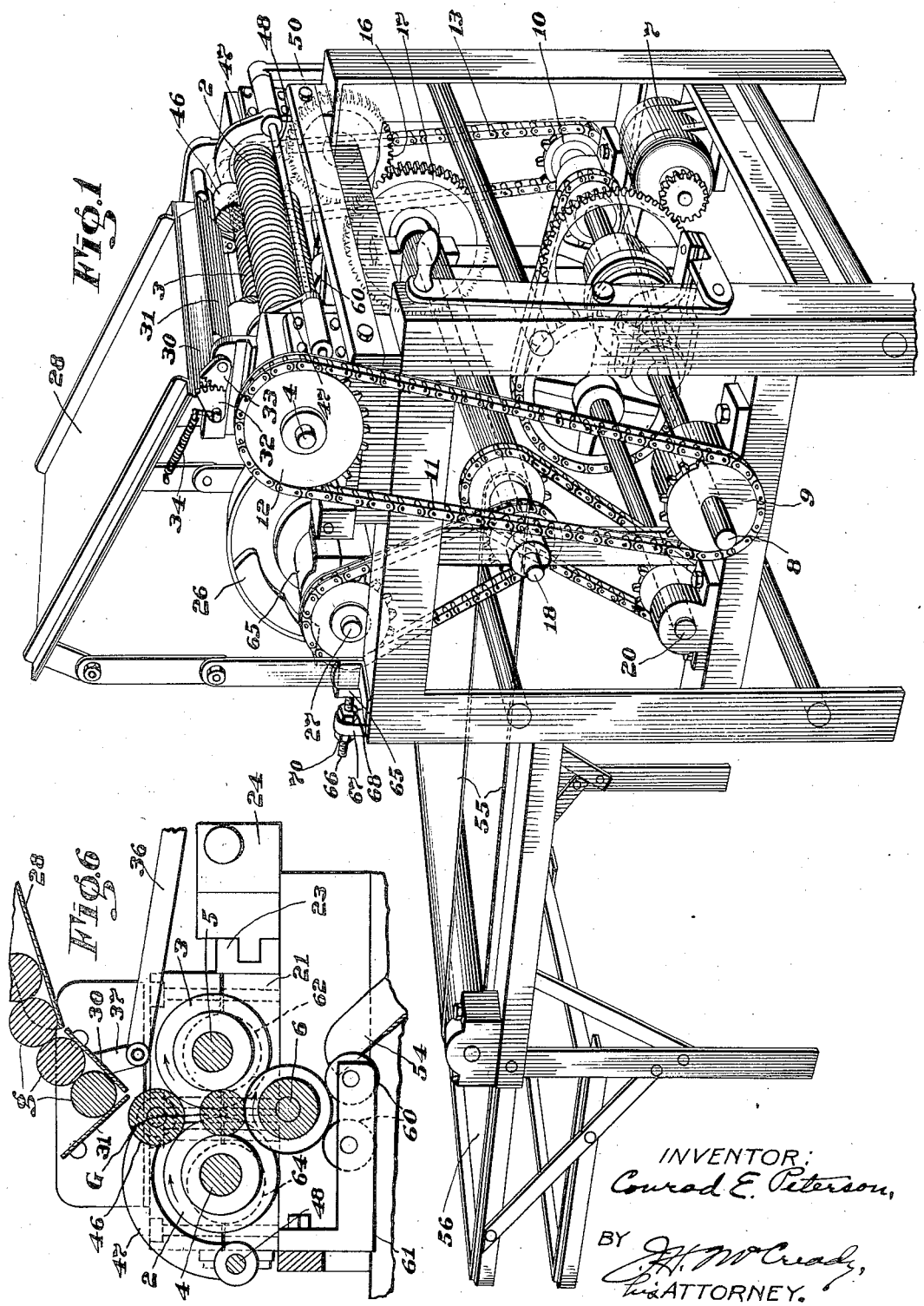
INVENTOR:
Conrad E. Peterson,
BY J. H. McCready,
his ATTORNEY.

Feb. 18, 1936.  C. E. PETERSON  2,031,573
MACHINE FOR USE IN THE MANUFACTURE OF CHEWING GUM
Filed Oct. 3, 1933  2 Sheets-Sheet 2
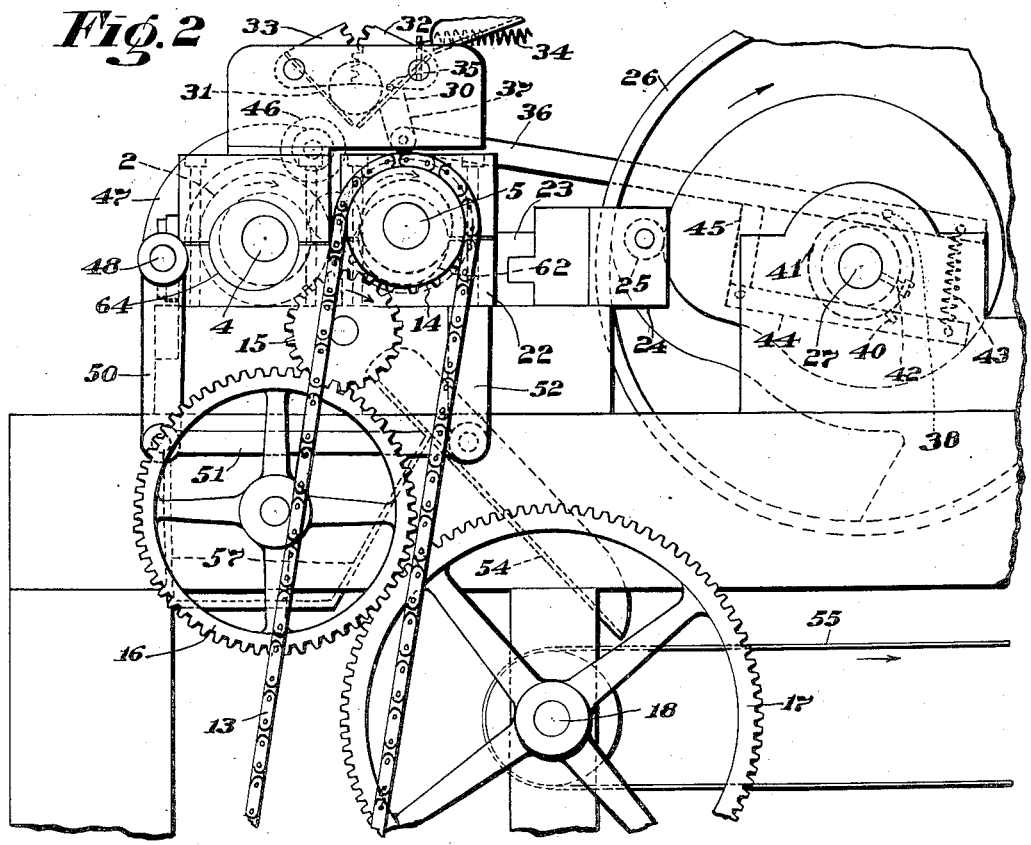
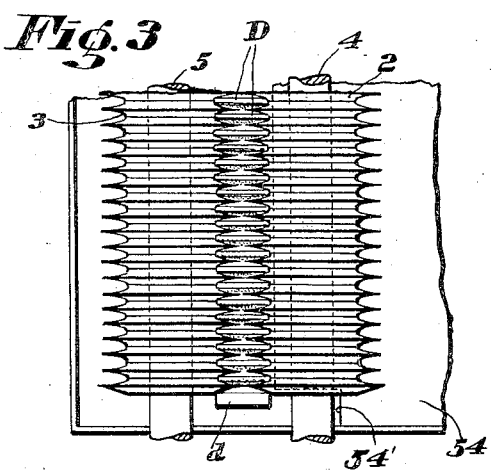
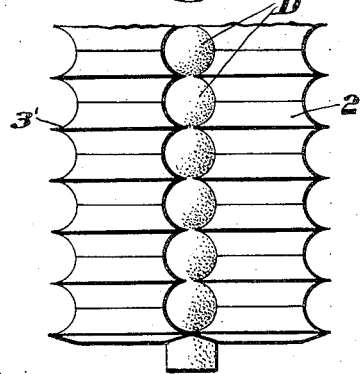
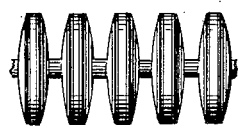
INVENTOR:
Conrad E. Peterson,
BY
ATTORNEY.

Patented Feb. 18, 1936

2,031,573

UNITED STATES PATENT OFFICE 2,031,573

MACHINE FOR USE IN THE MANUFACTURE OF CHEWING GUM

Conrad E. Peterson, Malden, Mass., assignor to De Long Gum Co., South Boston, Mass., a corporation of Massachusetts Application October 3, 1933, Serial No. 691,972

3 Claims. (Cl. 107—10)

This invention relates to machines designed primarily for use in the manufacture of chewing gum and other articles of confectionery which can be handled in essentially the same manner as chewing gum. The invention will be herein disclosed as embodied in a machine for making circular disks of chewing gum.

It is the chief object of the invention to devise a machine of this general character which will be entirely automatic in its action, will be exceptionally reliable in operation, and will have a high rate of production.

The nature of the invention will be readily understood from the following description when read in connection with the accompanying drawings, and the novel features will be particularly pointed out in the appended claims.

In the drawings,

Figure 1 is a perspective view of a machine constructed in accordance with this invention;

Fig. 2 is an end elevation of part of the mechanism of the machine illustrated in Fig. 1;

Fig. 3 is a plan view of the forming rolls of the machine, illustrating their operation on a stick of chewing gum;

Fig. 4 is a similar view of different rolls which may be used in the machine for the purpose of shaping a stick of gum to form balls;

Fig. 5 is a side elevation of another product which can be made in a machine of this type; and Fig. 6 is a vertical, sectional view through those parts of the machine which engage and operate on the sticks of gum.

Referring first to Figs. 1, 2, 3 and 6, the machine there shown comprises two horizontal forming rolls indicated at 2 and 3, respectively. As best illustrated in Fig. 3, each of these rolls comprises a series of sharp edged disks, the disks of the two rolls being arranged in opposed relationship with the edges of each opposed pair of disks lying in the same vertical plane. These rolls include shafts 4 and 5, respectively, which are mounted in suitable bearings, and they are driven in the same direction so that when a plastic stick of gum, such as that indicated at G, Fig. 6, is fed between them, they will operate simultaneously on it to work it into the form of a series of disks, such as those shown at D, Fig. 3. In order to support the gum while it is being shaped by the forming rolls, a third roll 6, Fig. 6, is mounted immediately below the bite of the forming rolls where the edges of the pieces D of gum can rest on it, this supporting roll revolving in the same direction as the forming rolls so that it cooperates with them to revolve the gum. The supporting roll also is grooved, as indicated in Fig. 6, to receive the edges of the forming disks of the rolls 2 and 3.

The driving mechanism for the rolls above mentioned comprises an electric motor 7, Fig. 1, connected by suitable gearing to the counter shaft 8 carrying sprockets 9 and 10 at its opposite ends. A chain 11 connects the sprocket 9 with a sprocket wheel 12 fast on the shaft 4 of the roll 2 while similar connections, including a chain 13 and sprocket wheel 14, Fig. 2, are provided at the opposite end of the machine for driving the roll 3. The supporting roll 6 has a pinion 15, Fig. 2, secured rigidly to one end thereof which is driven through gears 16 and 17 from a counter shaft 18. This shaft, in turn, is driven by sprocket and chain connections with another shaft 20, Fig. 1, located beside and parallel to the counter shaft 8, the former being driven from the latter by additional sprocket and chain connections, as clearly illustrated in said figure.

In order to permit the introduction of successive sticks of gum between the forming rolls 2 and 3, and to permit the discharge by gravity of the shaped pieces of gum, the roll 3 is mounted to reciprocate toward and from its companion roll 2. For this purpose the shaft 5 of this roll is supported in bearing blocks 21 and 22, Figs. 2 and 6 both of which are mounted for horizontal reciprocating movement at right angles to the shaft which they support. Connected to each block is a cam follower 24 carrying a roll 25 which runs in a path of a cam 26 secured fast on a horizontal shaft 27, one such cam being provided for each block. The shaft 27, as shown in Fig. 1, is chain connected to the shaft 18 previously referred to. Preferably the cams 26 are so designed that they quickly withdraw the roll 3 from the position shown in Fig. 6, gradually return it to said operative position again, and hold it in the latter position for a brief dwell.

During the inward or return movement of the roll 3 a new stick of gum is fed into the bite of the rolls and this feeding movement is so controlled that the gum is presented to the rolls at exactly the desired time. In the particular arrangement shown the gum feeding mechanism comprises an inclined chute 28 arranged to receive a series of sticks or rolls g, Fig. 6, of gum. At the bottom of this chute is a gate consisting of two inclined plates 30 and 31, both pivoted near their upper edges and connected together by gear segments 32 and 33, respectively. A coiled spring 34 connected to the plate 30 normally holds the gate closed with the plate 30 resting against the fixed stop 35, Fig. 2. In order to open the gate at the desired point in each cycle of operations of the machine, a bar 36 is pivoted to an arm 37, which is rigidly secured to and projects from the plate 30, and this bar carries a pin 38, Fig. 2, which is arranged to be engaged by another pin 40 projecting radially from a collar 41 secured fast on the cam shaft 27. When such engagement occurs the bar 36 will be moved longitudinally, toward the right, Fig. 2, thus opening the gate and allowing a stick g of gum to roll down into the bite of the forming rolls 2 and 3. Due to the fact that the pin 40 rotates around the axis of the shaft 27, it quickly passes out of engagement with the pin 38, whereupon the spring 34 again closes the gate. The bar 36 rests in a groove in the collar 41 and thus is guided for movement longitudinally of itself. Proper timing of the opening movement of the gate is provided for by securing the collar 41 adjustably to the shaft 27 as by the set screw 42, Fig. 2. The bar 36 is held down in the groove of the collar by means of a spring 43 which connects said bar with another bar 44 which is pivoted to an arm 45 that is fixed to the bar 36, as illustrated in Fig. 2.

There is sometimes a tendency for a stick of gum dropped into the bite of the forming rolls to ride on the edges of these rolls instead of dropping down into position for them to operate properly on it. In order to prevent such an occurrence it is usually preferable to equip the machine with a hold-down roll 46 that is arranged to bear on the stick of gum and to force it downwardly into its normal position between the forming rolls. This roll 46 is supported for idle rotation in two arms 47—47, Fig. 1, located at the opposite ends of the forming rolls. Both of these arms are secured fast on a rock shaft 48, and an arm 50, Figs. 1 and 2, fast on this rock shaft, is connected by a link 51, Fig. 2, with another arm 52 that projects downwardly from the bearing block 22 and is rigidly secured to it. It will be clear from an inspection of Fig. 2 that when the block 22 is moved toward the right by the cam mechanism to carry the forming roll 3 away from its companion roll 2, the connections just described will swing the hold-down roll 46 upwardly and toward the left, thus moving this roll into a position where it will not interfere with the feeding of the next stick of gum into the bite of the forming roll. As the roll 3 makes its return movement, the hold-down roll will be moved back to its initial position and will follow the stick of gum G downwardly as the latter descends while the forming rolls operate on it. Any danger of the stick of gum riding up out of its proper position thus is definitely obviated.

It will be clear from the foregoing that in each cycle of operations of the machine, and starting from a condition in which the roll 3 has moved outwardly or away from its companion roll, the roll 3 next moves toward the roll 2 and, at about the time that it arrives in such a position that it can cooperate with the other roll to support a stick of gum, one of the sticks g will be released by the gate 30—31 and will drop into the bite of the rolls. The gum at this time is in a solid form but is sufficiently soft so that it can be readily shaped and molded. Its contact with the edges of the disks of the rolls 2 and 3 cause it to revolve around its own axis. At the same time the edges of these disks cut into the surface of the gum and form grooves in it. This action continues as the forming rolls relatively approach each other, thus deepening the grooves, until finally the entire stick is worked into a series of disk-like pieces, such as those illustrated at D in Fig. 3. Before this shaping operation is completed, the gum has dropped down between the forming rolls and its edge rests on the upper surface of a supporting roll 6. This roll cooperates with the forming rolls to rotate the gum, and the rotary contact of the gum with all three rolls work the disks into a circular outline, even if the original stick of gum is badly misshapen when delivered to the machine. After a brief dwell, with the parts in this relationship, the forming roll 3 is withdrawn by the cam 26, thus allowing the shaped pieces of gum to drop out of the machine by gravity. The operations above described are then repeated.

The finished pieces are guided away from the rolls through an inclined chute 54, Figs. 2 and 6, on to the upper run of a conveyor belt 55 which delivers them to a tray 56, Fig. 1. A pulley on the shaft 18 drives the conveyor belt 55. A small piece of scrap stock, such as that indicated at d, Fig. 3, may be left at each end of the series of disks, and the chute 54 is so notched or cut away, as indicated at 54', Fig. 3, that it will not catch these small sections of scrap. Consequently, they will drop through the machine into a pan 57, Fig. 2, and thus will be kept separate from the finished product.

The forming rolls may be so adjusted that they will either separate the disks D completely from each other or will leave these pieces partly connected together. In some cases it is desirable to leave groups of a certain number connected together, but to separate the groups from each other, and this obviously can be done by making the disks of the proper shape and dimensions. In fact, a wide variety of shapes may be produced in this machine by giving the disks of the forming rolls the necessary shapes and dimensions. For example, if the edges of the disks are made relatively thick, a product like that illustrated in Fig. 5 will be produced. Again, if the forming rolls are made of the contour illustrated at 2' and 3' in Fig. 4, the gum stick will be shaped to produce a series of balls, such as those shown at D', Fig. 4.

In order to avoid any tendency of the supporting roll 6 to spring, the central portion of this roll may be supported by two steady rolls 60, Fig. 6, the latter being mounted on a bracket 61 secured rigidly to the frame of the machine.

I have found that in making these disks of gum, better results are obtained if the forming roll, which is running down when it engages the gum, is located at a slightly lower level than the roll which is running up. This relationship varies for different products, and in order to permit the relative adjustment of the two rolls into the desired relationship to each other, I prefer to mount both rolls so that they can be adjusted both up or down, and also toward and from each other. For this purpose the ends of the shaft 5 of the roll 3 are mounted in eccentric bushings 62—62, the bushings being supported for rotary adjustment in the bearing blocks 21 and 22. The shaft 4 of the other roll is similarly supported in eccentric bushings 64—64. Each bushing may be locked in its adjusted position by the split sections of its bearing block and preferably, also, by a set screw.

In order to facilitate the adjustment of the forward limit of movement of the forming roll 2 and to provide, also, for the accommodation of different sizes of forming rolls, the bearings 65—65 for the cam shaft 27 are mounted for horizontal adjustment toward and from the forming rolls. Preferably, also, each block 65 has a screw threaded rod 66, Fig. 1, secured to it and extending rearwardly therefrom through a stationary lug 67. Nuts 68 and 70 are threaded on this rod at opposite sides of the lug 67 so that by properly manipulating these nuts the cam shaft may be moved backward or forward, as desired.

It will be evident from the foregoing that the invention provides a machine which is entirely automatic in operation and which has an exceptionally high rate of production.

While I have herein shown and described a preferred embodiment of the invention, it is contemplated that the invention may be embodied in other forms without departing from the spirit or scope thereof.

Having thus described my invention, what I desire to claim as new is:

1. In a machine for making shaped pieces of chewing gum, the combination of two parallel horizontal forming rolls for acting simultaneously on opposite sides of an elongated body of chewing gum, mechanism for supporting said rolls for adjustment toward and from each other and for independent adjustment into different vertical relationships to each other, mechanism for revolving said rolls, said rolls being shaped to work said body of gum into a plurality of pieces of approximately predetermined shape and dimensions, means cooperating with said rolls to support the gum while the rolls operate on it, and mechanism for reciprocating one of said forming rolls toward and from its companion roll.

2. In a machine for making shaped pieces of chewing gum, the combination of two parallel horizontal forming rolls for acting simultaneously on opposite sides of an elongated body of chewing gum, mechanism for revolving said rolls, said rolls being shaped to work said body of gum into a plurality of pieces of approximately predetermined shape and dimensions, bearings for said rolls including eccentric bushings supporting the rolls for rotation and bearing members in which the bushings are mounted for independent rotary adjustment about the axes of the respective rolls, and mechanism for reciprocating one of said forming rolls toward and from its companion roll.

3. In a machine for making shaped pieces of chewing gum, the combination of two parallel horizontal forming rolls for acting simultaneously on opposite sides of an elongated body of chewing gum, mechanism for revolving said rolls, said rolls being shaped to work said body of gum into a plurality of pieces of approximately predetermined shape and dimensions, bearings for said rolls including eccentric bushings supporting the rolls for rotation and bearing members in which the bushings are mounted for independent rotary adjustment about the axes of the respective rolls to change the vertical relationship of said rolls to each other, cam mechanism for reciprocating one of said forming rolls toward and from its companion roll, and additional means operable to adjust the spacing of said rolls while maintaining undisturbed their vertical relationship to each other and the relationship of said cam mechanism to its respective roll.

CONRAD E. PETERSON.